(12) United States Patent
Liu et al.

(10) Patent No.: US 6,411,471 B1
(45) Date of Patent: Jun. 25, 2002

(54) LOW FRICTION BEARING PIVOT FOR DISC DRIVE

(75) Inventors: Xiong Liu; Joseph Cheng-Tsu Liu; Choon Kiat Lim; Wai Meng Chan, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 18 days.

(21) Appl. No.: 09/607,347

(22) Filed: Jun. 30, 2000

Related U.S. Application Data

(60) Provisional application No. 60/141,620, filed on Jun. 30, 1999.

(51) Int. Cl.$^7$ .................................................. G11B 5/98
(52) U.S. Cl. .................................. 360/265.2; 360/265.6
(58) Field of Search ........................... 360/265.2–265.6

(56) References Cited

U.S. PATENT DOCUMENTS

| | | |
|---|---|---|
| 4,845,579 A | 7/1989 | Wilkinson, Jr. |
| 4,995,025 A | 2/1991 | Schulze |
| 5,029,030 A | 7/1991 | Luecke |
| 5,117,318 A | 5/1992 | Immler et al. |
| 5,161,077 A * | 11/1992 | Jabbari .................... 360/265.6 |
| 5,355,268 A | 10/1994 | Schulze |
| 5,510,940 A | 4/1996 | Tacklind et al. |
| 5,559,652 A | 9/1996 | Heath et al. |
| 5,729,406 A | 3/1998 | Faris |
| 5,757,588 A | 5/1998 | Larson |
| 5,768,060 A | 6/1998 | Albrecht et al. |
| 5,835,309 A | 11/1998 | Boutaghou |
| 6,078,475 A * | 6/2000 | Lawson .................... 360/265.2 |

* cited by examiner

Primary Examiner—A. J. Heinz
(74) Attorney, Agent, or Firm—Derek J. Berger; Shawn B. Dempster

(57) ABSTRACT

A pivot mechanism is disclosed for mounting a rotatable actuator on a base of a disc drive. The pivot mechanism is made up of a shaft on which a housing is rotatably mounted by a lower ball bearing set and an upper bearing provided by co-acting surfaces of the shaft and the housing.

19 Claims, 4 Drawing Sheets

LOW FRICTION BEARING PIVOT FOR DISC DRIVE

This patent application claims priority from U.S. Provisional Application No. 60/141,620 filed on Jun. 30, 1999.

FIELD OF THE INVENTION

The present invention relates generally to disc drives. More particularly the present invention relates to a pivot mechanism for a rotatable actuator in a hard disc drive (HDD) and a HDD that includes such a pivot mechanism.

BACKGROUND OF THE INVENTION

In HDD's rotary actuators are used to position magnetic transducers (heads) over selected information bearing tracks on the discs. The transducers have to be positioned with great precision by the servo-mechanism driving the actuators (usually a voice coil motor—VCM) which requires that the actuator should have a small frictional resistance to rotation along with no looseness or backlash due to clearances in the pivot bearings of the actuator. Such pivot bearings have been provided by two spaced sets of ball bearings housed in annular races which are mounted between a shaft, and a rotatable housing. The shaft is mounted on a base of the HDD and the actuator body is mounted on the housing. The bearing sets are pre-loaded so that each exerts a small axial force on the other to eliminate the internal clearances of the bearings. The pre-load force has to be adjusted carefully to provide adequate dynamic properties without increasing the frictional resistance to rotation (torque) of the assembly to an unacceptable extent. Nevertheless, this frictional torque is significant and lowering it as much as possible is highly desirable, particularly for high track density applications.

Another problem is that of cost. In HDD applications, higher quality ball bearings are required to assure proper (precision) servo-operation of the actuator. For example, a ball bearing of requisite quality will generally cost about one-third of the total cost of the pivot bearing arrangement. In order to stay competitive, HDD manufacturers continually seek lower cost design options.

U.S. Pat. No. 5,510,940 entitled "Ball Spindle for Reduced Friction Rotary Actuator in Disk Drive" by T. A. Tacklind et al, granted Apr. 23, 1996, discloses a modified two bearing arrangement in which a further ball is associated with each of an upper and lower ball bearing set to support the rotary actuator of a disc drive. However whilst this may provide a reduced friction solution, it does not significantly reduce costs because two specialised ball bearing sets are still employed along with two additional balls.

U.S. Pat. No. 5,835,309 entitled "Pivot Bearing" by Z. Boutaghou, granted Nov. 10, 1998, discloses another arrangement in which two freely rotating balls are mounted on the axis of rotation of an actuator and are axially separated, one at each axial end of the assembly. Each ball in this arrangement is confined by a moving concave bearing surface of the rotatable actuator and a corresponding fixed concave bearing surface of a fixed component. This structure, however, principally improves shock resistance but at the expense of increased friction because the area of contact between the balls and the concave bearing surfaces is increased compared with a conventional design using multiple balls in an annular race.

A need exists to provide a low friction bearing pivot mechanism for a rotary actuator in a disc drive at a low cost. The present invention meets this need and offers other advantages over the prior art.

SUMMARY OF THE INVENTION

The present invention relates to disc drives that have a pivot mechanism for the rotary actuator which meets the above mentioned need.

In accordance with one embodiment of the invention there is provided a disc drive which includes a base on which a drivable spindle is mounted. The drivable spindle carries at least one disc having a plurality of data storage tracks thereon. A rotatable actuator assembly is mounted on the base via a pivot mechanism and this assembly includes an actuator body and a transducer mounted on the actuator body which is positionable adjacent a data storage track on the disc on rotation of the actuator body. The pivot mechanism of the actuator assembly has a shaft mounted on the base and a housing, to which the actuator body is attached, rotatably mounted on the shaft. The mounting of the housing on the shaft is via an annular ball bearing set located near to the base end of the shaft and another bearing structure which is provided by co-acting surfaces of the shaft and the housing.

In another embodiment the invention provides a pivot mechanism as such for a rotatable actuator in a disc drive.

Preferably the bearing structure is provided by a convex surface on an end of the shaft or on the housing which engages a concave surface on the other of the housing or the shaft. Preferably the convex and concave surfaces are conical with the concave surface having a larger included angle than the convex surface. The included angle of the concave surface may be about 120° and the included angle of the convex surface may be about 90°. The co-acting surfaces of the shaft and the housing may be such as to define a point bearing. Preferably the convex surface is on the shaft and the concave surface is on the housing.

These and various other features as well as advantages which characterize the present invention will be apparent upon reading of the following detailed description and review of the associated drawings.

DETAILED DESCRIPTION

Figure 1:
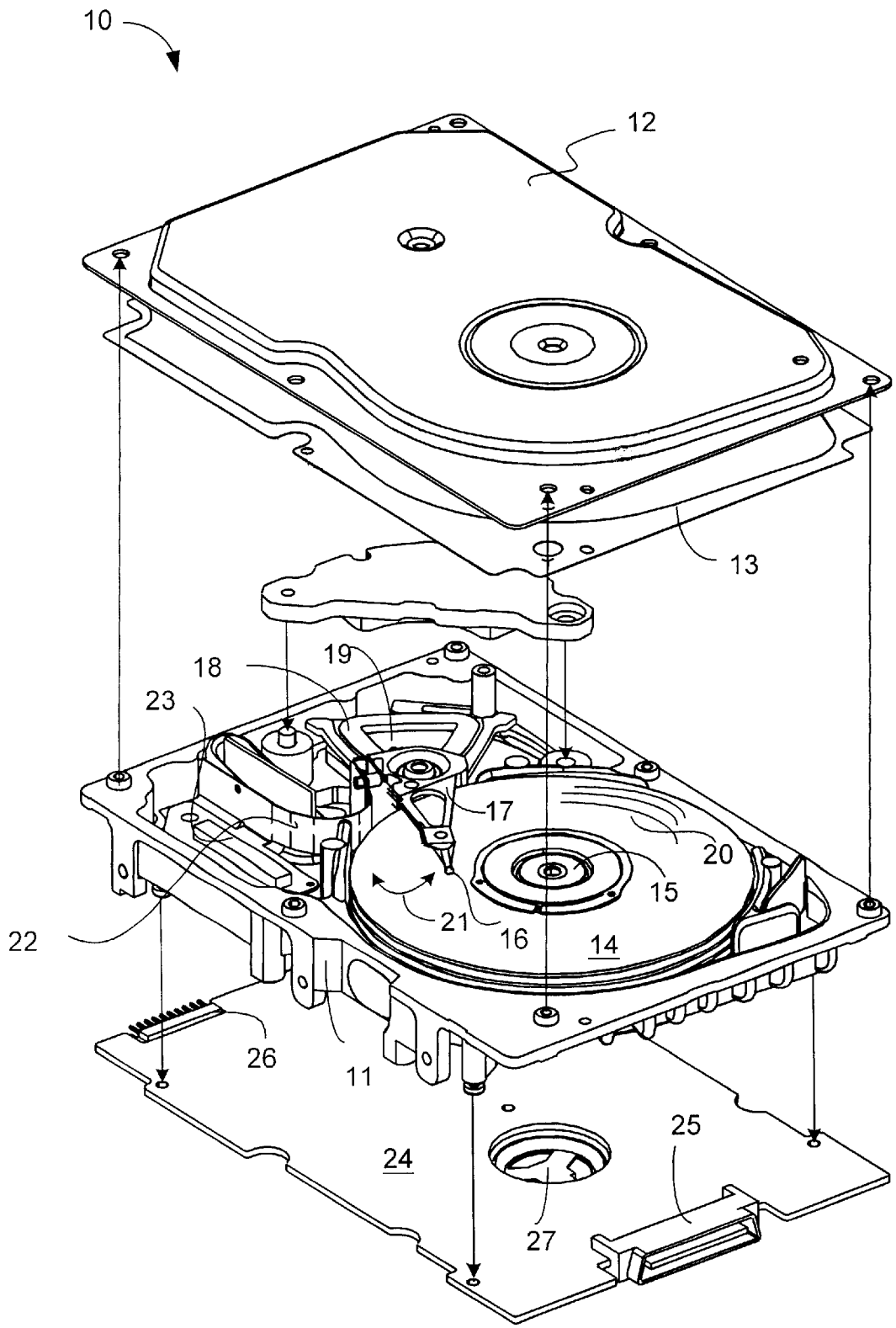
FIG. 1 is an exploded view of a disc drive.

FIG. 1 shows a disc drive 10 in exploded view. Briefly, the disc drive 10 includes a housing base 11 and a top cover 12, which engage a gasket 13 to form a sealed housing that maintains a clean environment inside the disc drive 10. A plurality of discs 14 is mounted for rotation on a spindle motor hub 15. A plurality of transducer heads 16 is mounted to an actuator body 17. The actuator body 17 is adapted for pivotal motion under control of a voice coil motor (VCM) including a voice coil 18 and magnets 19 to controllably move a head 16 to a desired track 20 along an arcuate path 21. Signals used to control the VCM and the heads 16 pass via a flex circuit 22 and a connector 23 to and from electronic circuitry on controller board 24. The controller board 24 includes a fibre channel interface 25, a serial port connector 26 and a spindle connector 27. The actuator assembly which includes the actuator body 17 and transducers 16 is mounted on the base 11 via a pivot mechanism 30, sometimes termed a pivot cartridge.

A prior art pivot cartridge 30 (see FIG. 2) is made up of a shaft 32 on which is mounted a housing 34 via two spaced annular ball bearing sets 36, 38. The actuator body 17 is attached to the housing 34. The ball bearings 36, 38 are positioned so that each exerts a small axial force on the other. This force is known as a pre-load. It eliminates internal clearances in the bearing sets 36, 38, but requires careful adjustment so as to ensure adequate dynamic properties without unacceptably increasing the frictional resistance to rotation of the housing 34 and thus of the actuator body 17 and transducers 16.

Figure 2:
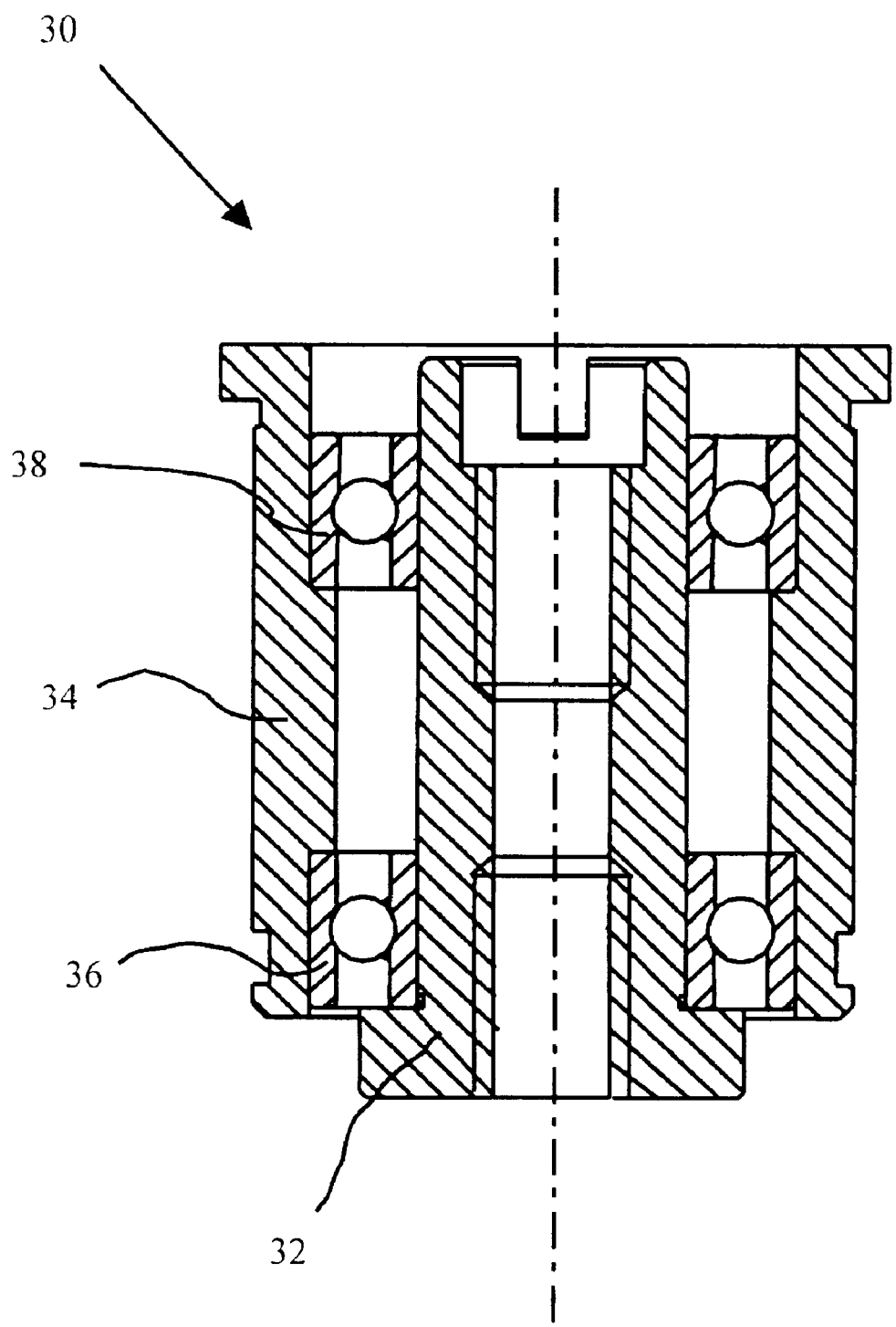
FIG. 2 is cross-sectional view of a prior art pivot mechanism.

Providing two ball bearing sets 36, 38 is relatively expensive and moreover, it is desirable that the frictional resistance to rotation be lowered as much as possible compared to that in a conventional pivot cartridge 30 as shown in FIG. 2, particularly for high track density discs.

Figure 3:
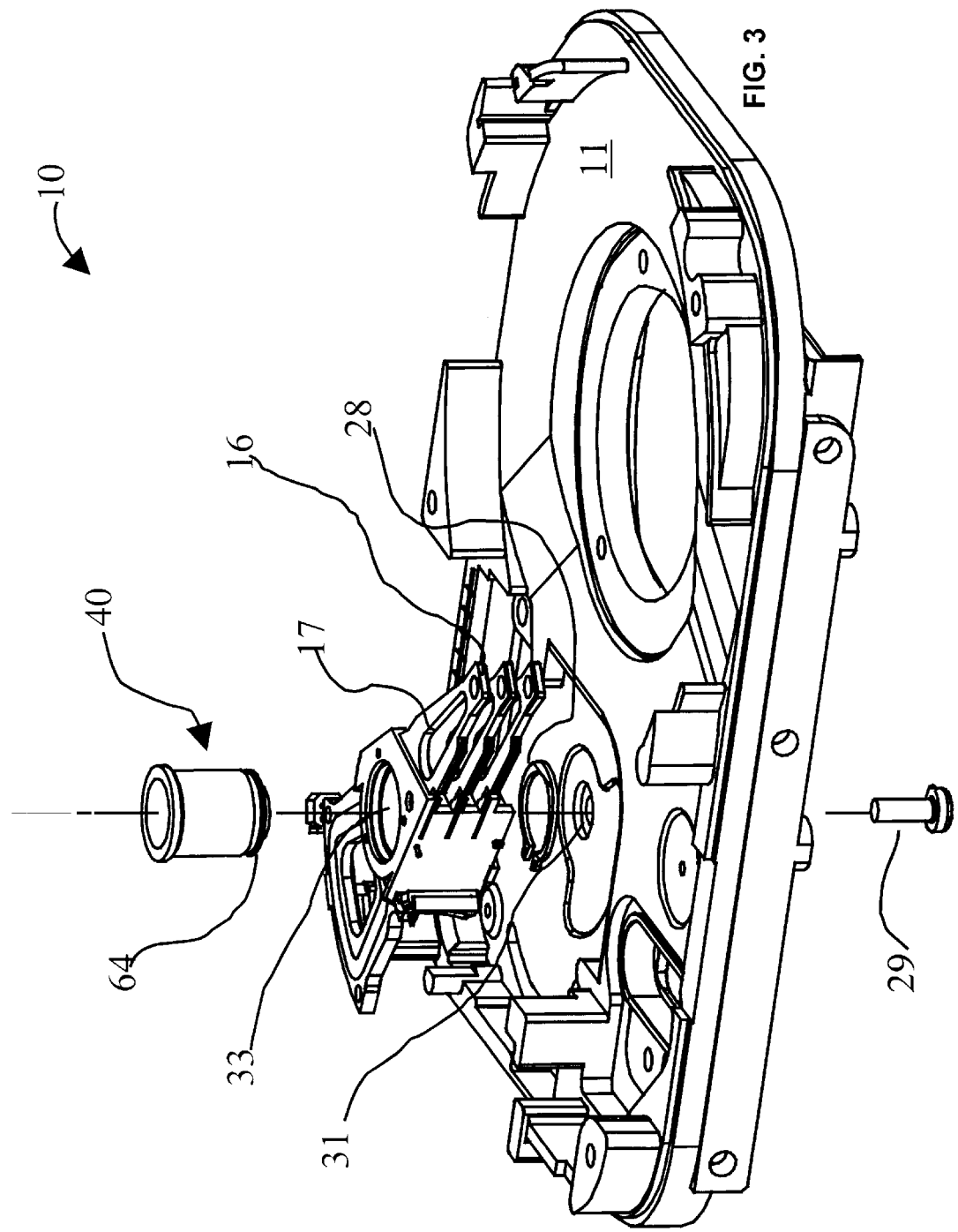
FIG. 3 is a view of a disc drive prior to installation of a pivot assembly.

According to the invention, the pivot cartridge 30 is replaced by a new pivot mechanism or cartridge 40. FIG. 3 shows an embodiment of the assembly of the pivot mechanism 40 in a disc drive 10. The pivot mechanism 40 is threaded through a hole 33 in the actuator assembly, which includes the actuator body 17 and transducer 16. The actuator assembly is secured to the pivot mechanism 40 with a C-clip 28, which is clamped onto the catch 64 of the pivot mechanism 40. The actuator assembly and pivot mechanism 40 are then secured to the base 11 of the disc drive 10 with a screw 29, the pivot mechanism 40 having a threaded shaft 35 to couple with the screw 29.

Figure 4:
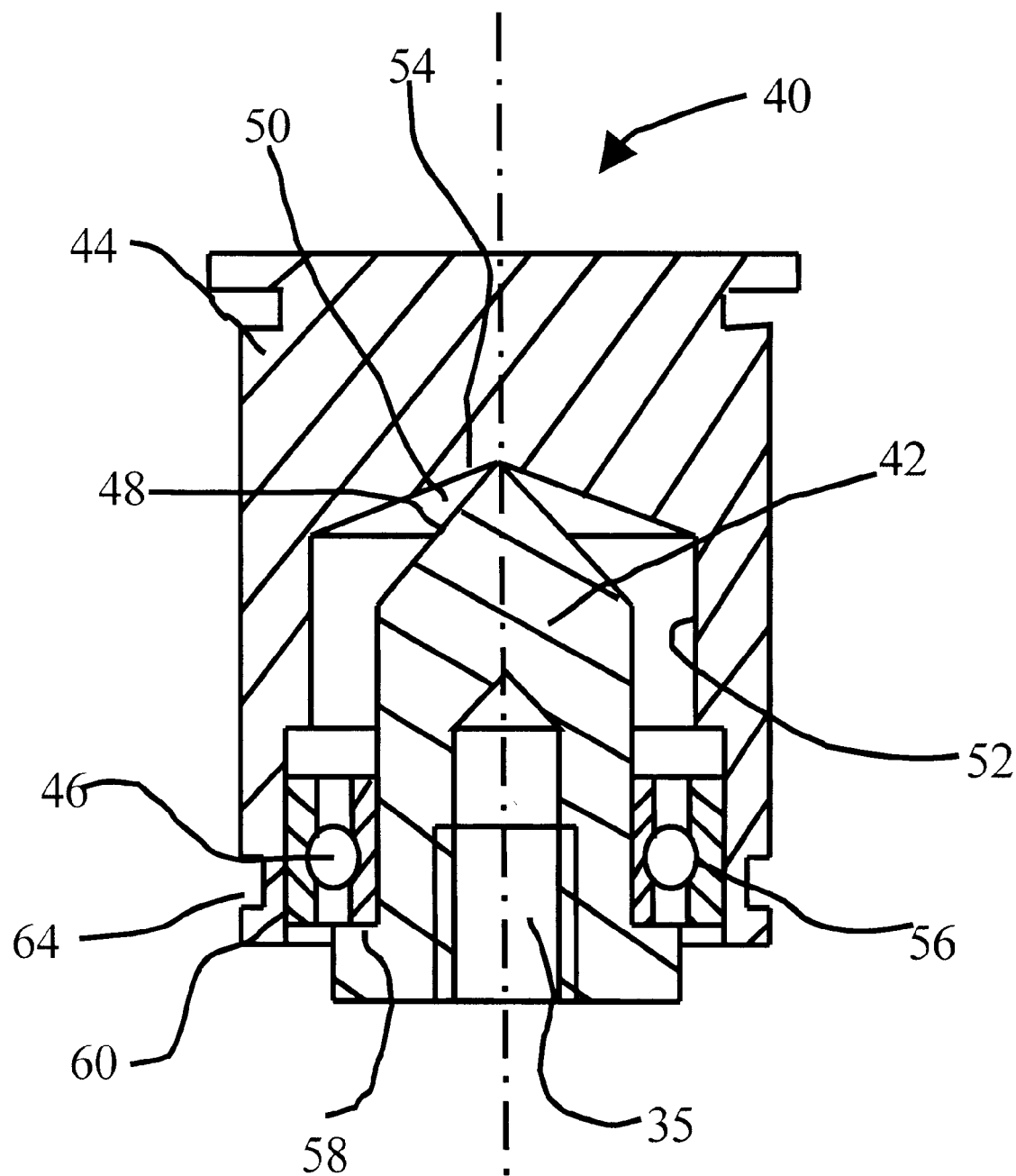
FIG. 4 is a cross-sectional view of a pivot mechanism according to an embodiment of the invention.

FIG. 4 shows the pivot mechanism 40 contains a shaft 42 on which is mounted a housing 44 to which the actuator body 17 is attachable, the shaft 42 being mountable on the base 11. The housing 44 is rotatably mounted on shaft 42 by an annular ball bearing set 46 which is located on the shaft 42 in proximity to the base 11 mounting end thereof, and a spaced bearing structure provided by co-acting surfaces 48 of the shaft 42 and 50 of the housing 44.

The housing 44 includes a downwardly open cylindrical recess 52 having an end wall 54 which provides the surface 50, which surface 50 is concave and preferably conical, and also preferably defines an included angle of about 120°. The surface 48 of shaft 42 is formed as an end surface on the shaft. Surface 48 is convex and also preferably conical, and may define an included angle of about 90°. The housing 44 seats over shaft 42 such that the surfaces 48 and 50 interface and thus co-act to provide another bearing support spaced from the ball bearing set 46.

The pivot mechanism 40 is assembled by fixing the inner annular ring 56 of sealed bearing set 46 to the shaft 42, against a shoulder 58 thereon, by an adhesive. The housing 44 is then assembled onto the shaft and a pre-load applied to the outer ring 60 of the bearing set 46 relative to the housing 44, with the outer ring 60 then being adhesively fixed to the housing 44 along the inner wall of a larger diameter section of recess 52 that terminates in a shoulder 62. Effectively, the co-acting surfaces 48 and 50 define a point bearing.

Although conical surfaces 48 and 50 are preferred, smoothly curved surface shapes are possible, or if conical surfaces are employed they may have included angles which differ from those mentioned hereinbefore, provided the co-acting surfaces contribute minimal friction against rotation of the housing 44 on shaft 42. Appropriate surface shapes, or included angles for conical surfaces, may be chosen in accordance with the minimal friction requirement and depending on the materials of the shaft and the housing. Preferably the shaft 42 and housing 44 are formed from stainless steel.

An advantage of the invention is that a lower cost pivot cartridge is provided because of the elimination of one ball bearing set. This may allow a cost saving of about 20 to 30%. Another advantage is that a lower friction torque is achieved compared to the conventional design because of the elimination of one ball bearing set. That is, the friction contributed by a point bearing of the present invention can be engineered to contribute less friction than the eliminated ball bearing set in that the area of contact between the co-acting surfaces 48 and 50 is much less than that in a bearing set, notwithstanding that the point bearing involves sliding friction compared to rolling friction. Still another advantage is that a pivot cartridge as described provides a small form factor. An even further advantage is that if any debris is generated, it will be contained inside the cavity formed by recess 52 above sealed bearing 46.

Another method to describe the invention is as follows:

A disc drive 10 made up of a base 24, a drivable spindle 15 mounted on the base 24, with a disc 14. The disc 14 has numerous data storage track 20. The disc drive 10 also has a rotatable actuator assembly which is mounted on the base 11 via a pivot mechanism 40. The actuator assembly includes an actuator body 17 and a transducer 16 mounted on the actuator body. The transducer 16 can be positioned adjacent to a data storage track 20 on the disc 14 on rotation of the actuator body 17. The pivot mechanism 40 works with a shaft 42 mounted on the base 11 and a housing 44 to which the actuator body 17 is attached. The actuator is rotatably mounted on the shaft 42 by an annular ball bearing 46 located proximate to the base 11 and a bearing structure spaced therefrom which is provided by co-acting surfaces of the shaft 42 and the housing 44. The bearing structure is provided by a convex surface 48 on one of an end of the shaft 42 and the housing 44 engaging a concave surface 50 on the other of the end of the shaft 42 and the housing 44. The convex 48 and concave 50 surfaces are conical with the concave surface 50 having a larger included angle than the convex surface 48. The included angle of the concave surface is about 120° and the included angle of the convex surface 48 is about 90°. The bearing structure is provided by a convex surface 48 on an end of the shaft engaging a concave surface 50 on the housing. The co-acting surfaces 48 and 50 define a point bearing.

The present invention also provides a pivot mechanism 40 for a rotatable actuator in a disc drive 10. The pivot mechanism 40 comprising a shaft 42 mountable on a base 11 of the disc drive and a housing 44 to which an actuator body 17 of the disc drive 10 is attachable, rotatably mounted on the shaft 42 by an annular ball bearing 46 and a bearing structure spaced therefrom which is provided by co-acting surfaces 48 and 50 of the shaft 42 and the housing 44.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the pivot mechanism while maintaining substantially the same functionality without departing from the scope and spirit of the present invention. In addition, although the preferred embodiment described herein is directed to a pivot mechanism for an actuator in a hard disc drive, it will be appreciated by those skilled in the art that the teachings of the present invention can be applied to other systems, like hard disc drive systems, without departing from the scope and spirit of the present invention.

What is claimed is:

1. A disc drive comprising:

a base;

a rotatable actuator assembly comprising a transducer, the transducer being positionable adjacent a data storage track on a disc; and a pivot mechanism comprising a shaft mounted on the base and a housing to which the actuator is attached rotatably mounted on the shaft by an annular ball bearing located proximate to the base and a bearing structure spaced therefrom which is provided by engaging surfaces of the shaft and the housing.

2. A disc drive as claimed in claim 1 wherein the bearing structure is provided by a convex surface on one of an end of the shaft and the housing engaging a concave surface on the other of the end of the shaft and the housing.

3. A disc drive as claimed in claim 2 wherein the convex and concave surfaces are conical with the concave surface having a larger included angle than the convex surface.

4. A disc drive as claimed in claim 3 wherein the included angle of the concave surface is about 1200 and the included angle of the convex surface is about 90°.

5. A disc drive as claimed in claim 2 wherein the bearing structure is provided by a convex surface on an end of the shaft engaging a concave surface on the housing.

6. A disc drive as claimed in claim 1 wherein the co-acting surfaces define a point bearing.

7. A disc drive as claimed in claim 1 in which the bearing structure is provided by a protrusion on one of an end of the shaft and the housing engaging a recess in the other of the end of the shaft and the housing.

8. A disc drive as claimed in claim 7 in which the protrusion is on an end of the shaft and the recess is in the housing.

9. A disc drive as claimed in claim 1, in which the actuator further comprises an actuator body to which the transducer and the housing are mounted, the disc drive further comprising:

a drivable spindle mounted on the base; and a disc having a plurality of data storage tracks carried by the spindle.

10. A pivot mechanism for a rotatable actuator in a disc drive, the pivot mechanism comprising:

a shaft mountable on a base of the disc drive; and a housing, to which an actuator body of the disc drive is attachable, rotatably mounted on the shaft by an annular ball bearing and a bearing structure spaced therefrom which is provided by engaging surfaces of the shaft and the housing.

11. A disc drive as claimed in claim 10 in which the engaging surfaces contact each other at a single point.

12. A pivot mechanism as claimed in claim 10 in which the bearing structure is provided by a protrusion on one of an end of the shaft and the housing engaging a recess in the other of the end of the shaft and the housing. each other at a single point.

13. A disc drive as claimed in claim 12 in which the protrusion is on an end of the shaft.

14. A disc drive as claimed in claim 12 in which the protrusion is conical.

15. A disc drive comprising:

a base;

an actuator; and means for pivotally mounting the actuator to the base.

16. A disc drive as claimed in claim 15 in which the mounting means comprises two surfaces rotatable relative to one another and which contact one another at a single point.

17. A disc drive as claimed in claim 15, in which the mounting means comprises an annular ball bearing assembly.

18. A disc drive as claimed in claim 15, in which the mounting means comprises a shaft mounted to the base.

19. A disc drive as claimed in claim 15, in which the mounting means comprises a housing mounted to the actuator.

* * * * *